(12) United States Patent
Mestanek et al.

(10) Patent No.: US 10,345,042 B2
(45) Date of Patent: Jul. 9, 2019

(54) DRYING CHAMBER, DRYING UNIT, DRIER OF RECYCLED ABRASIVE AND METHOD FOR DRYING WET RECYCLED ABRASIVE

(71) Applicant: PTV, spol. s r.o., Hostivice (CZ)

(72) Inventors: Jiri Mestanek, Prague (CZ); Pavel Pokorny, Prague (CZ); Daniel Kala, Bubovice (CZ)

(73) Assignee: PTV, spol. s r.o., Hostivice (CZ)

( * ) Notice: Subject to any disclaimer, the term of this patent is extended or adjusted under 35 U.S.C. 154(b) by 424 days.

(21) Appl. No.: 15/189,015

(22) Filed: Jun. 22, 2016

(65) Prior Publication Data

US 2016/0377343 A1 Dec. 29, 2016

(30) Foreign Application Priority Data

Jun. 25, 2015 (CZ) ..................................... 2015-437

(51) Int. Cl.
| | |
|---|---|
| *F26B 5/14* | (2006.01) |
| *F26B 17/20* | (2006.01) |
| *B24C 9/00* | (2006.01) |
| *F26B 3/084* | (2006.01) |
| *F26B 3/092* | (2006.01) |
| *F26B 3/04* | (2006.01) |
| *F26B 5/00* | (2006.01) |
| *F26B 23/00* | (2006.01) |

(52) U.S. Cl.
CPC .............. *F26B 17/20* (2013.01); *B24C 9/006* (2013.01); *F26B 3/04* (2013.01); *F26B 3/084* (2013.01); *F26B 3/0923* (2013.01); *F26B 5/00* (2013.01); *F26B 23/002* (2013.01); *Y02P 70/179* (2015.11); *Y02P 70/405* (2015.11)

(58) Field of Classification Search
CPC ...... B24C 9/006; Y02P 70/179; F26B 3/0923; F26B 5/00; F26B 17/20
USPC ......... 34/443, 262, 498, 500, 501, 507, 401; 451/87, 88
See application file for complete search history.

(56) References Cited

U.S. PATENT DOCUMENTS

| | | | | |
|---|---|---|---|---|
| 4,619,052 A | * | 10/1986 | Osburn ................. | E21B 21/063 34/368 |
| 5,979,663 A | * | 11/1999 | Herrmann .............. | B01D 43/00 209/138 |
| 7,147,545 B2 | * | 12/2006 | Gadd ...................... | B24B 57/00 451/38 |
| 8,771,040 B1 | * | 7/2014 | Lyras ..................... | B24C 9/006 451/87 |

* cited by examiner

*Primary Examiner* — John P McCormack
(74) *Attorney, Agent, or Firm* — Luoh J. Wu; Continent Patent Office LLP

(57) ABSTRACT

Drying of recycled abrasive that can be recycled separated or as a part of the full recycling system. Sorted and meshed wet recycled abrasive is kept in a hopper for wet recycled abrasive, it is continuously delivered using a screw feeder into a drying chamber on a vibration mesh. Air is blown in the chamber, using an air flow generator, under a vibration mesh. The recycled abrasive is moved and lifted on the mesh using air flow and mesh vibration, this provides for clots of recycled abrasive to break down to particles of recycled abrasive and abrasive mixes and dries.

14 Claims, 10 Drawing Sheets

Figure 1:
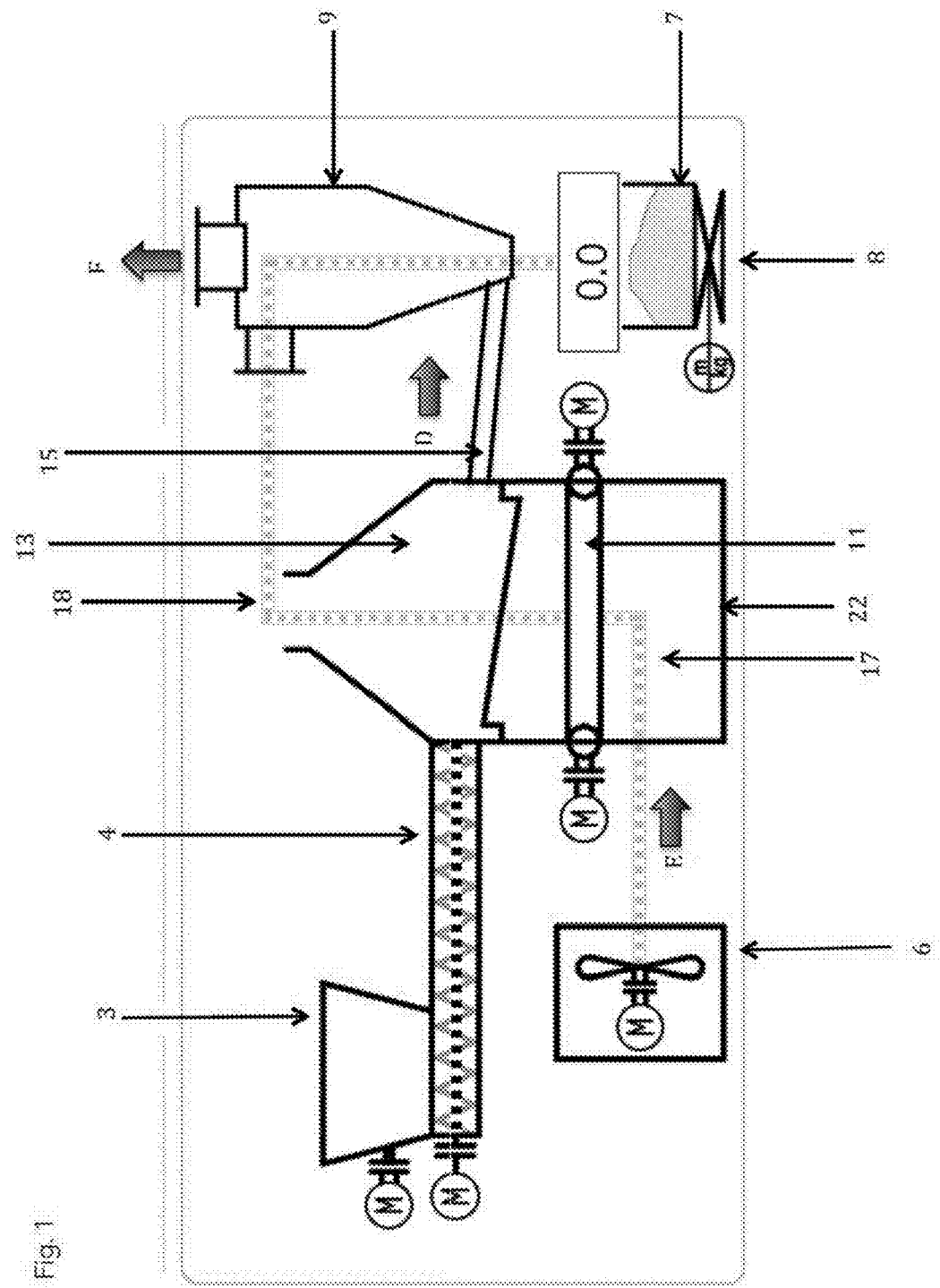

| 10 kg of abrasive | | Humidity of abrasive [%] | | | Humidity of abrasive [%] | | |
|---|---|---|---|---|---|---|---|
| | | 10 | 7 | 4 | 10 | 7 | 4 |
| wattage [kW] | Air temperature [°C] | Drying time [min] | Drying time [min] | Drying time [min] | Drying wattage [kg/h] | Drying wattage [kg/h] | Drying wattage [kg/h] |
| 0 | 21.3 | 20 | 15 | 8 | 30.0 | 40.0 | 75.0 |
| 2 | 23.1 | 18 | 13 | 7 | 33.3 | 46.2 | 85.7 |
| 4 | 26.7 | 16 | 12 | 7 | 37.5 | 50.0 | 85.7 |
| 6 | 28.2 | 14 | 10 | 6 | 42.9 | 60.0 | 100.0 |
| 8 | 30.4 | 12 | 9 | 5 | 50.0 | 66.7 | 120.0 |
| 10 | 33.7 | 10 | 8 | 5 | 60.0 | 75.0 | 120.0 |
| 12 | 35.8 | 8 | 7 | 4 | 75.0 | 85.7 | 150.0 |

Fig. 8

DRYING CHAMBER, DRYING UNIT, DRIER OF RECYCLED ABRASIVE AND METHOD FOR DRYING WET RECYCLED ABRASIVE

This application claims the benefit of Czech application number: PV 2015-437 filed on Jun. 25, 2015. The content of this document and the entire disclosure of publications, patents, and patent documents mentioned herein are incorporated by reference.

FIELD OF TECHNOLOGY

Equipment intended for abrasive recycling immediately with water jet user

STATE OF THE ART

The unconventional technique of high-pressure water jet has been developed, improved, and advanced for dozens of years and has achieved a high level of efficiency. We can say that it has turned into a common and highly utilised technique in many industries. The techniques for cutting with high-pressure water jet with CNC machines require a large quantity of abrasive which is rather costly and which is imported into the Czech Republic from abroad, mostly from Australia and India. Costs of abrasive acquisition amount up to 50% of all costs for operation of a CNC machine.

The abrasive material is used for cutting with abrasive water jet. These small particles are fed into a cutting head and they are pulled with a water jet in a mixing chamber. This water and abrasive mixture falls on the material cutting it. Water supplies a part of its kinetic energy to the abrasive, thus improving efficiency of the process. Therefore, cutting with hydro-abrasive jet (AWJ) is utilised above all for separation of hard materials. Abrasive has effect of cutting efficiency and on quality of processed surface. This is determined by size and shape of grain, chemical composition and weight flow. Choice of abrasive also depends on hardness of the material to cut. But, there is also another important factor, namely the price. The selection of the abrasive material has a large impact on the environment and a related recycling process. It was published that garnet abrasives and silica sands are not suitable for the recycling process (KRAJNÝ, Zdenko. Vodný lúč v praxi/*Water Jet in Practice*/—WJM. Bratislava: 1998. ISBN 80-8057-091-4.).

After separation, the used abrasive stays on a work bench together with clouded water and waste material. There is a problem what to do with the used abrasive that is not utilisable any more in this condition. It had to be liquidated as waste.

AQUAdem has developed an AQUArec PRO equipment which was able to recycle abrasive. Thus, used abrasive that has passed through all the cutting process could return into the process again. It was found that abrasive passing through the recycling process has not lost its capacity, thus it does not wear. Dirty water and abrasive are pumped from a cutting bench using a pneumatic pump, brought into a rotation separator and water and abrasive are separated there. Dirty water returns into the cutting bench to wash deposited abrasive so that it is easier to pump out. Separated abrasive falls into an oven to dry completely at high temperature. The separator screens out abrasive and clean abrasive falls into a hopper.

Another equipment for abrasive recycling is produced by PTV spol. s.r.o. Recycling of abrasive used in hydroabrasive separation of material is carried out using its own source of heat—electric heating.

The equipment is fitted with a separate source of heat, independent from surrounding equipment, namely electric heating coils placed in the drying kiln. The material to be recycled is held up in the drying kiln using air flow from a drying fan during the drying process. The air entering the fan is preheated because of passing space between shells of the drying kiln—this way a part of waste heat is utilised from the kiln. A wet separation process runs on entry into the drying kiln (main vibration separator—removing fine waste). A dry separation process runs on an exit from the drying kiln (exit vibration separator—rough waste). Then, dry sorted recyclate is poured into a vessel or into a sack.

The equipment has rather a high output: 50-80 kg of recyclate per hour. The equipment, however, requires continuous operation which is a significant handicap. The equipment has no optimised system for abrasive dosing, abrasive input is according to visual control, but it is interrupted manually with a corresponding transport delay, so that kiln overloading with wet abrasive would not occur. The abrasive must be raked manually (mechanically), so that caking into bigger pieces would not occur, which then could form into a single big piece and form a corpus that should be broken mechanically. Also under high temperature abrasive sinters on coils, the coils burn immediately and they are impaired permanently because used abrasive always contains a high share of residues of cut material, like plastic. The coils burn every other work shift, on average. A common practice is that this equipment is operated by up to two persons continuously.

The heating coils must be heated and thus the recycling unit has high electric input of 19 kW. At maximum output, the consumption is close to the installed input.

The equipment consumes 2500-3500 liters of pressure air per hour at 6 bar, and 250-350 liters of pure water per hour. The input mixture is stored in a screw feeder hopper and then the feeder transports it into a circle separator continuously. There minus mesh fraction (very fine material) is removed from the mixture using rinsing water. Meshed recyclate is transported from the circle separator into the drying oven, it is dried there using electric heating coils under simultaneous aeration with pressure air from the drying fan. The transport rate of wet abrasive cannot be adjusted in time and it has a large delay, which causes that much larger amount of abrasive accumulates in the oven than can be dried, and the abrasive must be mixed manually.

The capacity is 50-75 kg of dry recyclate per hour depending on the quality of the input mixture (content of utilisable abrasive particles in the mixture).

The equipment consumes much power: 23.14 kW to heat the heating coils, 3×400 V/50 Hz, consumption of lure water is 10-50l/hour.

DESCRIPTION OF THE INVENTION

The above disadvantages of the drying/recycling process can be eliminated using the novel system for abrasive recycling and drying.

First of all, a new method for drying of recycled abrasive has been developed, it can be recycled separately or as a part of the whole recycling system. The recycling system involves a system for sludge removal with a separator where suspension of abrasive sand, sludge and water is removed from a cutting bench using desludging equipment and big particles are sorted off the material, e.g. using a desludging system. A vibration separator has been installed in the desludging equipment, it provides for sorting the suspension into two fractions: under mesh waste (less than 0.1 mm) and over mesh material (over 0.1 mm) intended for further use—wet recycled abrasive. The waste together with water is collected into a large volume sack, and water is separated there. Water returns into the cutting bench and fine waste—sludge stays in the sack to be liquidated.

The capacity of the equipment depends directly on moisture of recycled abrasive to dry and on temperature of input air. Thus, it is recommended to put wet recycled abrasive into large volume sacks after sorting and meshing, and let the sacks stay for 3-5 days, at least, at temperature over 5° C. in dry environment, so that excessive water is removed. This can run under an outside shelter, for example.

Sorted, meshed and wet recycled abrasive is placed into a hopper for wet abrasive, transported using a screw feeder into the drying chamber to a vibration mesh continuously. The screw feeder adjusts doses of recycled wet abrasive with weight 1 to 10 kg from the hopper. Wet recycled abrasive moves on the vibration mesh, it is aired with inlet air, weight increase is monitored with a scale, and the process dosing—drying—weighting is repeated after weight increase on the scale minus water share in loaded weight of wet recycled abrasive is achieved. Air is pumped into this chamber, using an air flow generator, under the vibration mesh. Wet recycled abrasive is moved and raised on the mesh with air flow and mesh vibrations, this way clots of wet recycled abrasive break down to particles of wet recycled abrasive and it mixes and dries.

It is favourable to use waste heat that is generated as a by-product of operation of machines for hydroabrasive separation with water jet. Such a source can be a high pressure pump and above all its cooler for hydraulic oil in oil/air arrangement. Hot air (30-50° C.) is removed from the pump space with a fan through a pipe into the drying oven under the vibration mesh. Having been dried, recycled abrasive gets up in the air flow and it drifts into a cyclone separator.

It is favourable to place the mesh under a collecting vessel that has some wall height. Grains of dry recycled abrasive must overcome in air flow, and this way they pass into exit from the drying chamber. There is a cyclone separator on outlet from the drying chamber to remove small dust from output air. After entry of dry recycled abrasive into the cyclone separator, centrifugal force separates particles of dry recycled abrasive from air flow. Dry recycled abrasive falls down because of gravity into an adjacent hopper for dry recycled abrasive (large capacity sack) which can be placed on a pallet scale which allows continuous monitoring of weight of dry recycled abrasive.

The air goes out through the upper side of the separator into space. It is favourable to add additional air filtration in the output of air from the cyclone separator.

The equipment is controlled with programmable automatic machine which provides for continuous operation and minimises need of operating crew.

The large benefit of the equipment is that the drying process does require nor attendance nor continuous control, the drying system is quite considerate to the vibration mesh. During a pilot operation, the mesh was replaced just after more than 1200 operation hours. Consumption of power in full operation of the equipment amounts to 3.1 kW; 3×400 V/50 Hz. According to results of tests on prototypes, the capacity of the equipment is in the range of 30-60 kg of dry recycled abrasive per operation hour. This capacity depends on temperature of inlet air. It is directly correlated—the more heat in the input, the shorter is the drying time for unit quantity of recycled abrasive and the higher is hourly capacity of the equipment.

The drier of recycled abrasive works unattended, the only need is to add wet recycled abrasive into the hopper for wet recycled abrasive and to replace the full hopper for dry recycled abrasive for empty one. Dry recycled abrasive exits the drier as suitable for immediate use for abrasive water jet cutting.

The conditions for storing recycled abrasive are the same as for new, unused abrasive. It is favourable to install a mesh with size approximately 0.5-1 mm into the hopper to eliminate entry of impurities into abrasive for cutting.

The drier of recycled abrasive has capacity of 15-50 kg of dry recycled abrasive per hour depending on the temperature of inlet air and moisture of inlet recycled abrasive.

The very process of drying runs in the drying chamber which can operate as independent or as a part of a drying unit, or of the drier of recycled abrasive.

The drying chamber contains a vibrating mesh, a collecting vessel positioned above the mesh, which bottom sloped towards the outlet of dry recycled abrasive from the drying chamber. There is free space between a wall of the drying chamber and a wall of the collecting vessel. Air flow occurs there and the air lifts and airs recycled abrasive to dry and there are 5 to 10 vertical blades to orientate abrasive grains into vertical movement in this space. The drying chamber is placed in the air flow which flows upwards with speed 0.7 to 1.2 m/s and under transport pressure 350 to 450 Pa. The vibrating mesh shakes grains of recycled abrasive and the grains move on the mesh in free space. As soon as the grains of recycled abrasive get dry, they hover and as soon as they pass into the space above the collecting vessel which prevents air flow, they fall into the collecting vessel. The collecting vessel is connected to outlet of dry recycled abrasive from the drying chamber.

Preferably the collecting vessel occupies 50 to 80% area above the mesh. The collecting vessel can be sloped towards the mesh, best if under angle 5° to 20°. It also can involve a groove which empties into outlet of dry recycled abrasive from the drying chamber. Preferably the collecting vessel has installed sensors for detection of quantity of dry recycled abrasive, providing for continuous drying process with the optimum rate of dosing wet recycled abrasive.

The drying chamber can be part of a drying unit.

The drying unit contains a drying chamber, a chimney and an air chamber. The chimney is equipped with inlet of wet recycled abrasive and with air outlet. There are two vibro motors in the upper part of the air chamber, fixed to a vibration frame which again is fixed to the mesh along the perimeter and also in the centre, namely using a system to fix the mesh.

The air chamber empties towards the fan which is used as a source of air flow.

The drying unit can be part of a drier of recycled abrasive.

The drier of recycled abrasive contains a hopper for wet recycled abrasive which is connected with the drying unit with the screw feeder, the cyclone separator and the hopper of dry recycled abrasive with a scale.

The chimney empties with air outlet F into the cyclone separator which is equipped with an inlet of wet recycled abrasive from the screw feeder, and the screw feeder is placed on the bottom of the hopper of wet recycled abrasive.

It is beneficial if the bottom of the hopper of wet recycled abrasive is equipped with a hole and also if the bottom is lower than inlet of wet recycled abrasive from the screw feeder which facilitates outflow of excessive water from wet recycled abrasive.

The drier of recycled abrasive operates as a buffer—it is useful to start drying if adequate stock of wet recycled abrasive is in the screw feeder hopper. Therefore, it is possible to combine attendance of this equipment with that of the cutting bench because the drier does not require permanent control, also in the case that the hopper is filled with wet presorted recycled abrasive from an external source. The whole control of the equipment is planned in an automatic mode with signalling of operation, limit and faulty conditions.

Thus, the crew just takes the large capacity sack with dry recycled abrasive and fits a new, empty sack below the outlet from the cyclone separator. In case of supply of wet recycled abrasive from an external source, the crew fills the screw feeder hopper with wet recycled abrasive together with exchange of large capacity sacks. This action should not exceed 5-15 minutes, depending on local conditions.

SUMMARY OF PRESENTED DRAWINGS

FIG. 1: Schematic drawing of recycled abrasive drier

Figure 2:
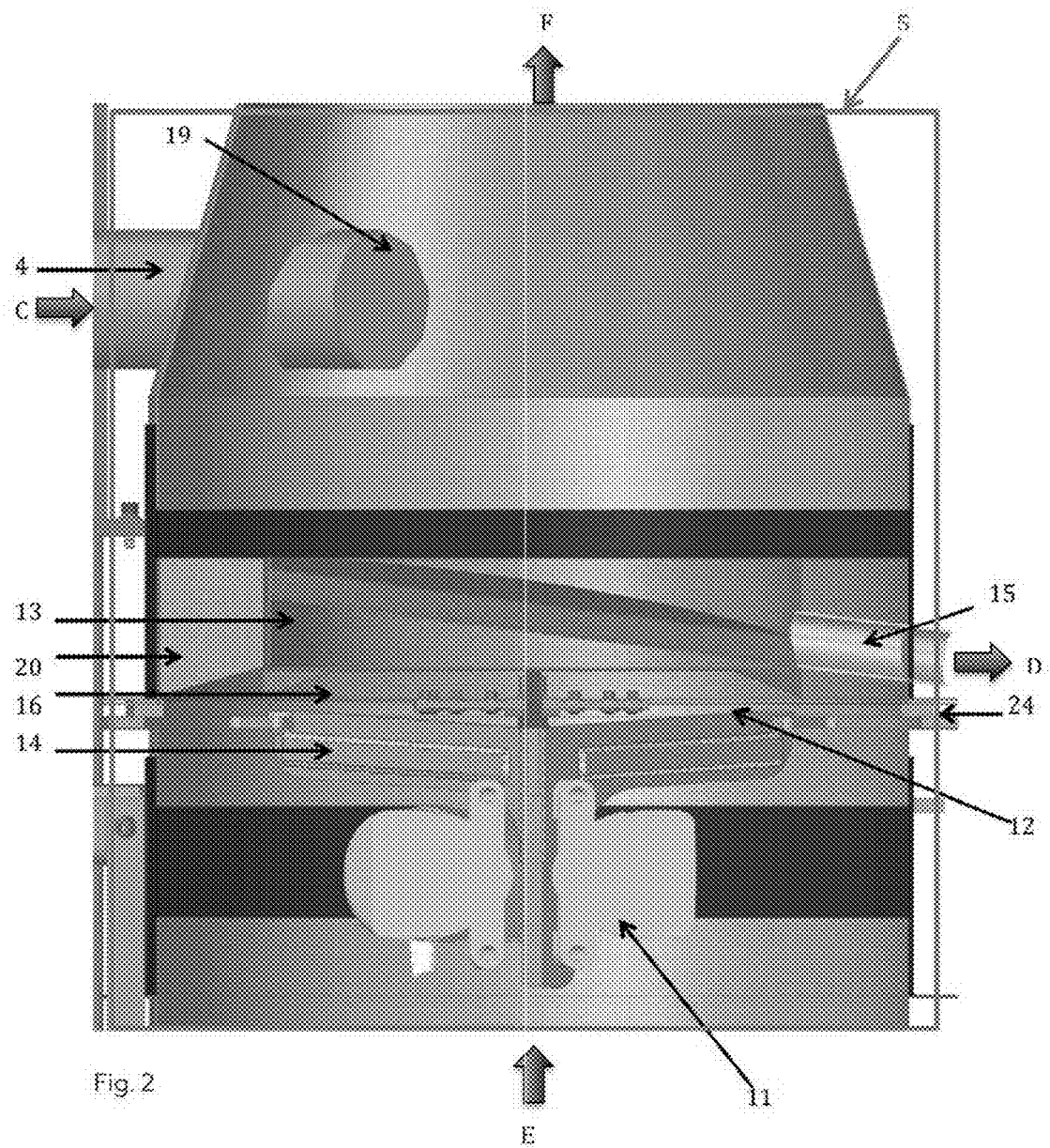

FIG. 2: Detail cut view of drying chamber

Figure 3:
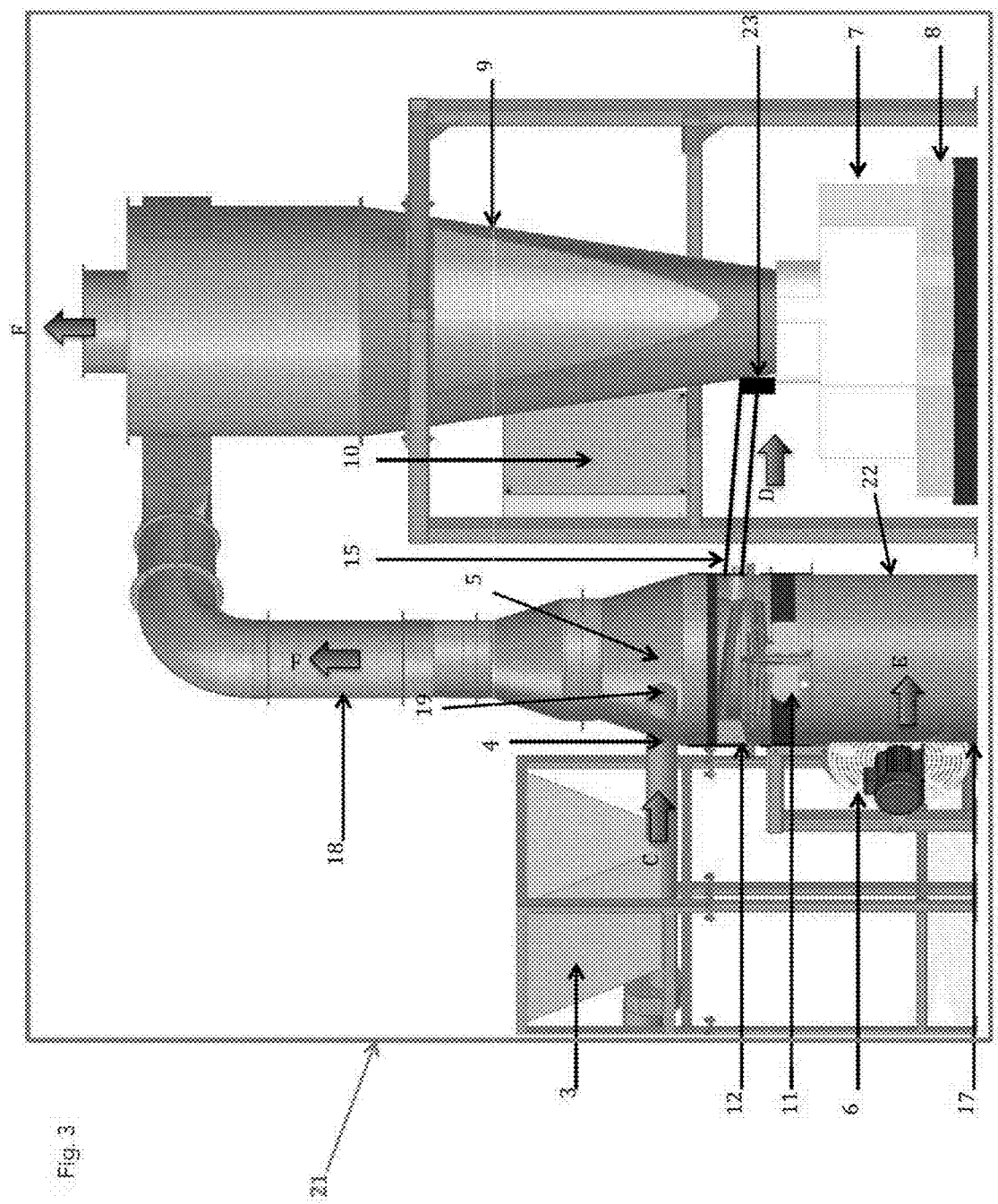

FIG. 3: Side view of recycled abrasive drier

Figure 4:
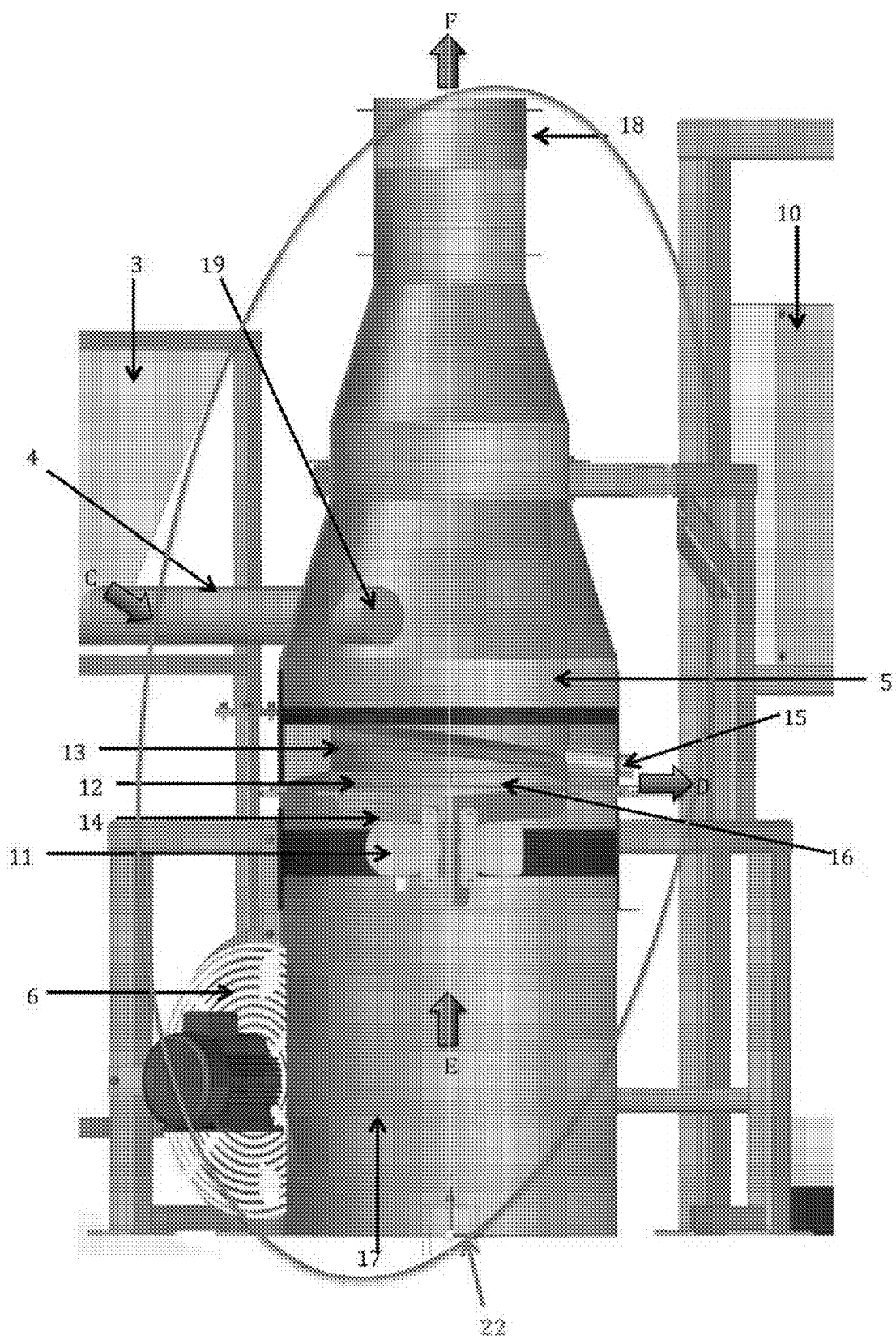

FIG. 4: View of recycled abrasive drier

Figure 5:
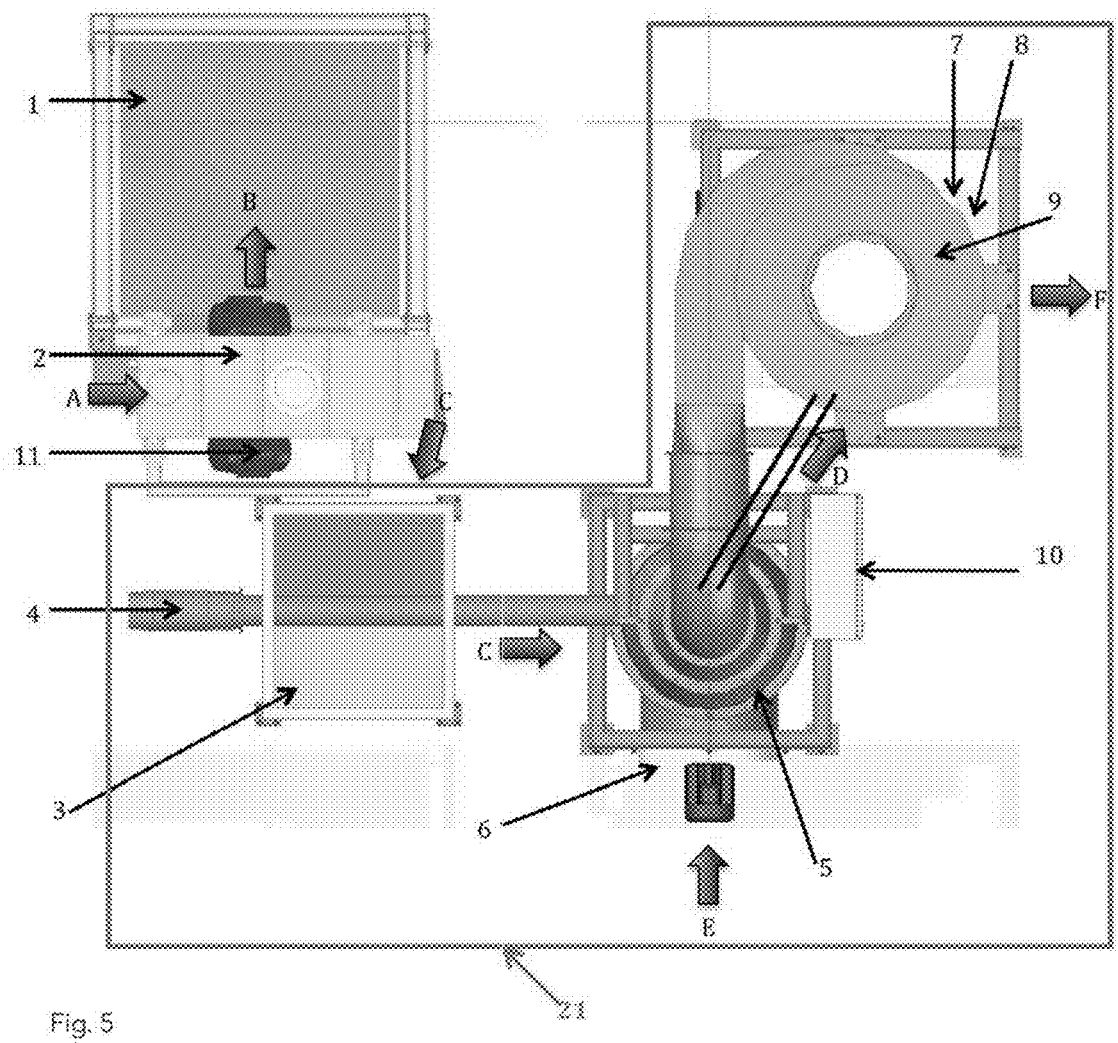

FIG. 5: Top view of recycled abrasive drier

Figure 6:
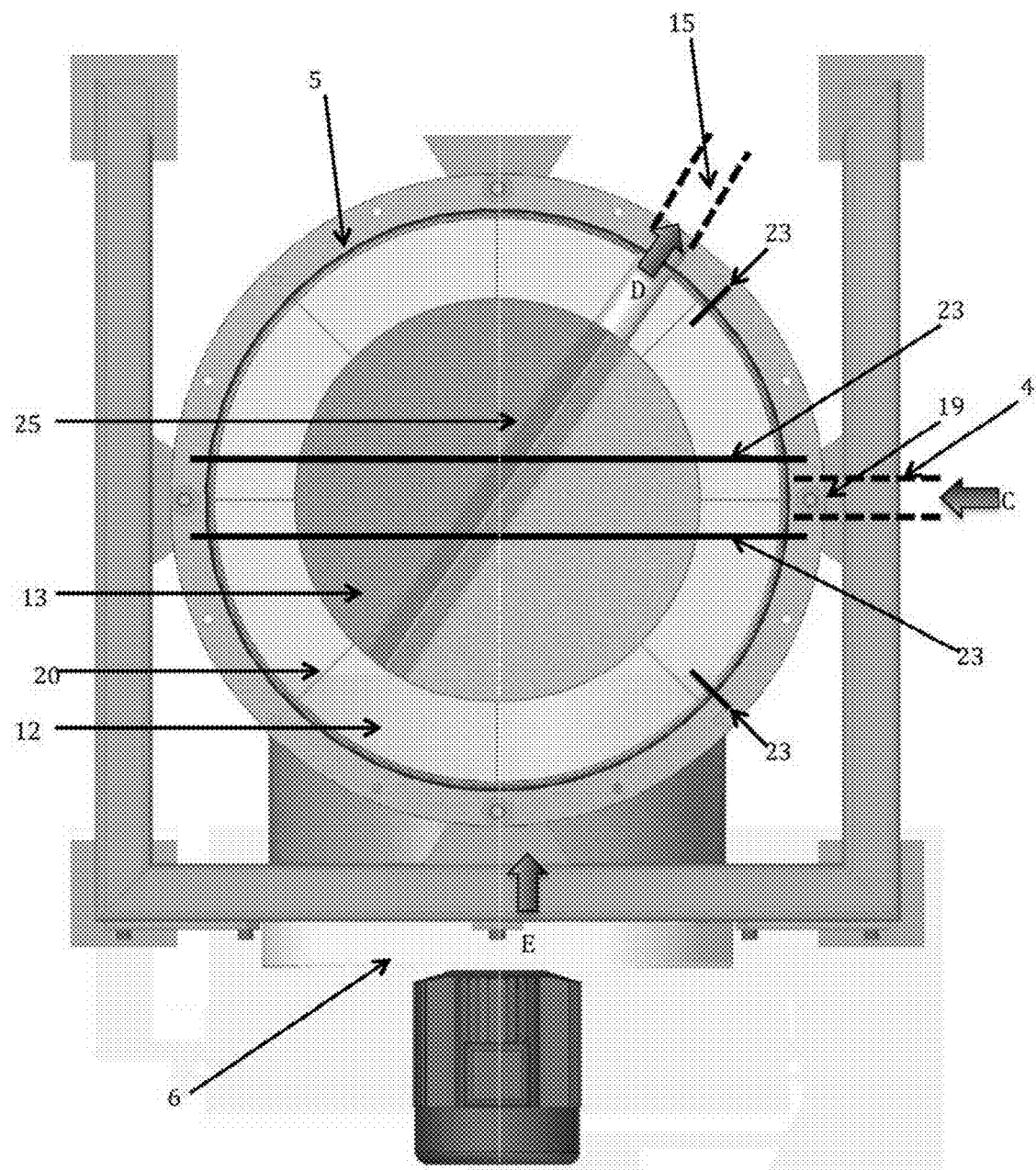

FIG. 6: View of collecting vessel with mesh

Figure 7:
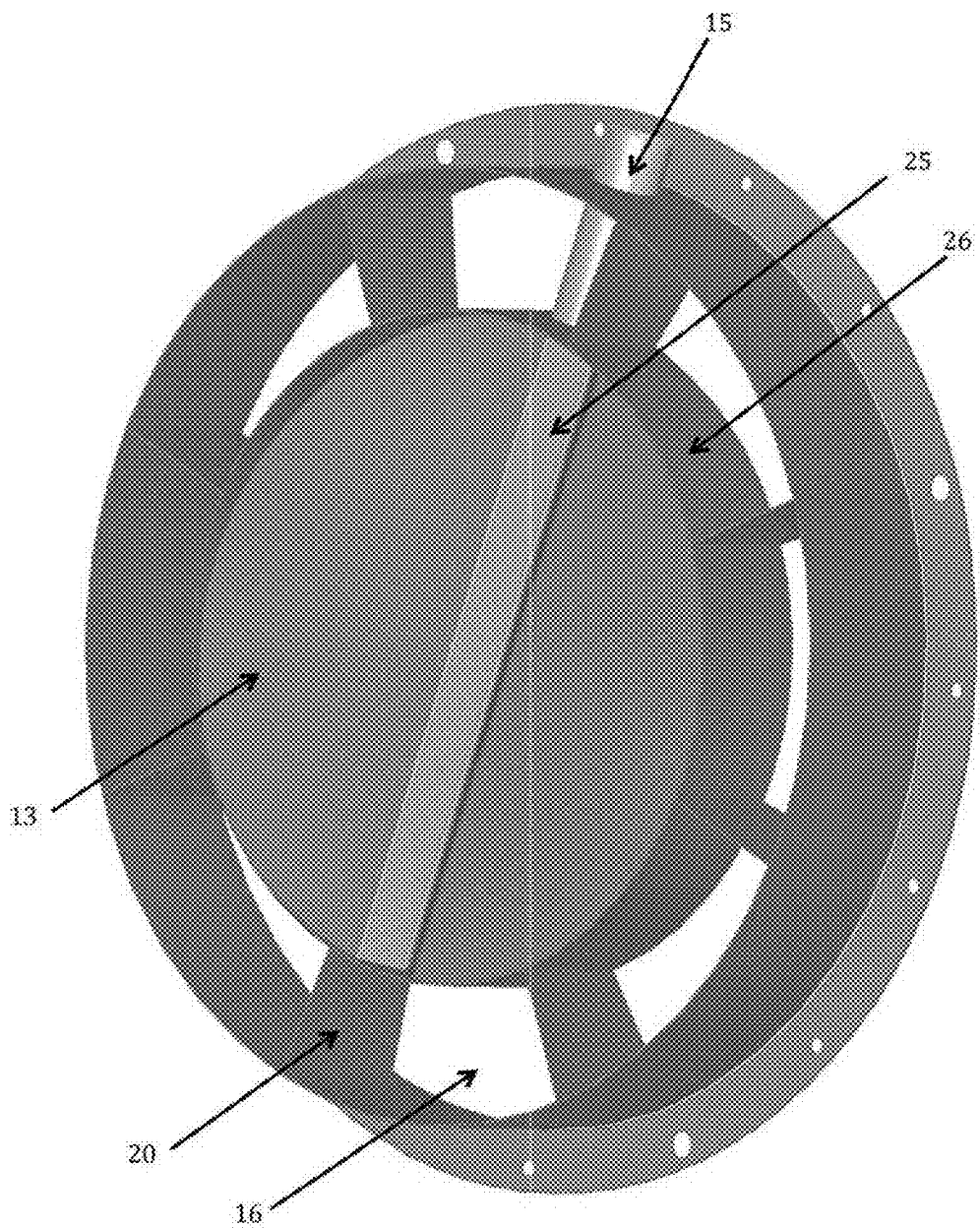

FIG. 7: Detail of collecting vessel

Figure 9:
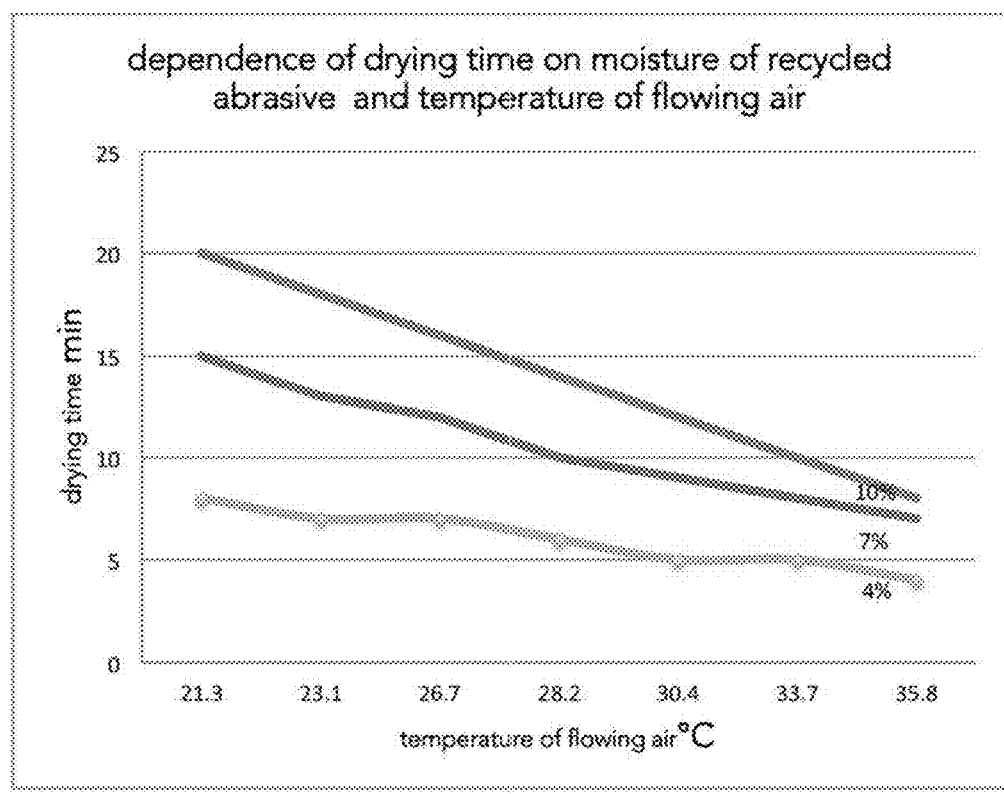
Figure 10:
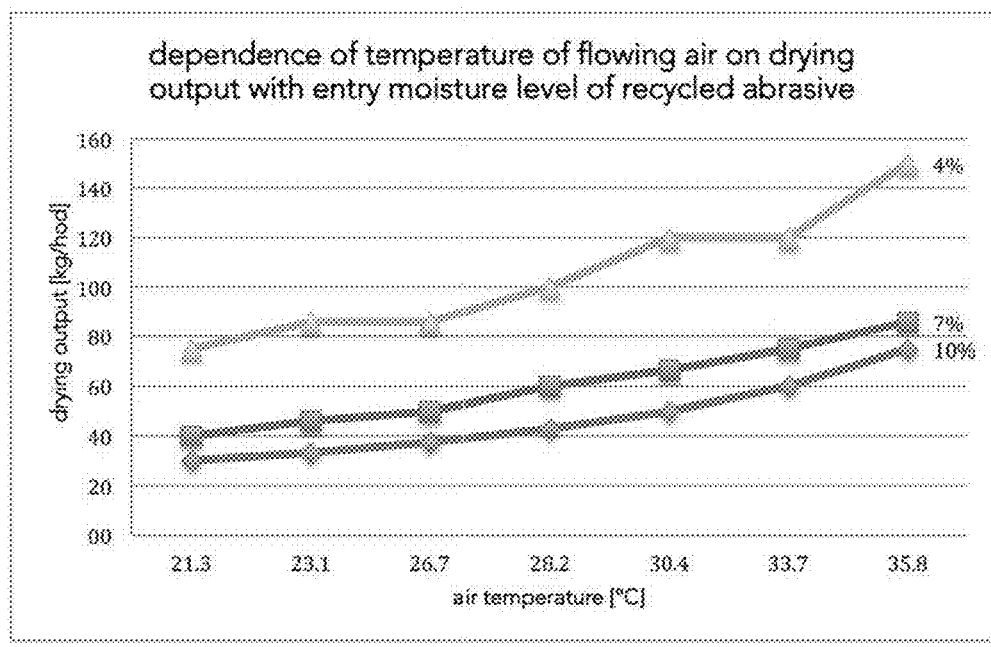

FIG. 8: Table of drying process with various level of moisture of recycled abrasive and various temperature of flowing air FIG. 9: Chart of dependence of drying time on moisture of recycled abrasive and temperature of flowing air FIG. 10: Chart of dependence of temperature of flowing air on drying output with entry moisture level of recycled abrasive 10%, 7% and 4%

EXAMPLES OF INVENTION EXECUTION

Example 1

Drying Chamber 5

Drying chamber 5 involved vibrating mesh 12 fixed to vibration frame 14 along the perimeter and also in the centre, namely using a system 24 to fix the mesh, drying chamber 5 involved also collecting vessel 13 positioned above the mesh 12 which had the bottom sloped towards outlet 15 of dry recycled abrasive from the drying chamber. 5 vertical blades 20 were positioned in space 16 between the wall of drying chamber 5 and the wall of collecting vessel 13 to deflect grains of recycled abrasive into vertical movement.

Example 2

Process of Recycled Abrasive Drying—Almandine Garnet of Australian Origin in Equipment from Example 1

Almandine garnet of Australian origin contained $SiO_2$, $Al_2O_3$, FeO, grain size 150-300 μm, 80 MESH. Drying chamber 5 was positioned in air flow E with velocity 0.87 m/s, pressure 432 Pa and temperature 35° C. Mesh vibration 12 was ON, 10 kg of wet recycled abrasive with moisture of 15% was dosed on mesh 12. Drying time of recycled abrasive was 11 minutes, when all the dried recycled abrasive was transported to outlet 15 of dry recycled abrasive from the drying chamber 5.

Example 3

Process of Abrasive Drying—Almandine Garnet of Australian Origin in Equipment from Example 1

Almandine garnet of Australian origin contained $SiO_2$, $Al_2O_3$ and FeO, grain size 200-600 μm, 50 MESH. Drying chamber 5 was positioned in air flow E with velocity 0.87 m/s, pressure 432 Pa and temperature 35° C. Mesh vibration 12 was ON, 10 kg of wet recycled abrasive with moisture of 15% was dosed on mesh 12. Drying time of recycled abrasive was 12.5 minutes, when all the dried recycled abrasive was transported to outlet was transported to outlet 15 of dry recycled abrasive from the drying chamber 5.

Example 4

Drier of Recycled Abrasive 21 in Static Conditions

Drier of recycled abrasive 21 involved hopper 3 wet recycled abrasive which was connected using screw feeder 4 to drying unit 22, cyclone separator 9 and hopper 7 of dry recycled abrasive with a scale.

Drying unit 22 involved drying chamber 5, chimney 18 and air chamber 17. Chimney 18 emptied with air outlet F into cyclone separator 9, it was fitted with inlet 19 of wet recycled abrasive from screw feeder 4, which was placed on bottom of feeder 3 of wet recycled abrasive. Two vibro motors 11 fixed to vibration frame 14 were positioned in the upper part of air chamber 17 and air chamber 17 emptied to the fan which was used as source 6 of air flow. Drying chamber 5 involved vibrating mesh 12 fixed to vibration frame 14 along the perimeter and also in the centre, namely using system 24 to fix the mesh, drying chamber 5 also contained collecting vessel 13 with height 100 mm and diameter 400 mm. Collecting vessel 13 was positioned above mesh 12 with diameter 680 mm, and 30 mm above this mesh 12. 6 vertical blades 20 were positioned in space 16 between the wall of drying chamber 5 and the wall of collecting vessel 13 to deflect grains of recycled abrasive into vertical movement. Air from air chamber 17 flowed through mesh 12 upwards into drying chamber 5. Vibrating mesh 12 shook grains of recycled abrasive and they moved along the perimeter of drying chamber 5. The total height that the grains of recycled abrasive had to overcome to get into collecting vessel 13 was 130 mm. Collecting vessel 13 had a groove terminating in outlet 15 in its bottom sloped towards outlet 15 of dry recycled abrasive from drying chamber 5, and the other end of the outlet terminated in a wall of cyclone separator 9 to its low edge which provided for sealing of the system and the hopper of dry recycled abrasive was connected to cyclone separator 9 tightly which prevented loss of recycled abrasive and its whirling around. Sensor 23 was positioned at the end of pipe of outlet 15

Chimney 18 emptied in the cyclone separator to remove small dust off outlet air F. After entry of dry recycled abrasive into cyclone separator 9, centrifugal force separated particles of recycled abrasive from air flow. Dry recycled abrasive D fell because of gravy down into connected hopper 7 for dry recycled abrasive (large capacity sack) which was laid on pallet scale 8 which provided for continuous monitoring of weight of dry recycled abrasive D.

Example 5

Drying Process in Drier of Recycled Abrasive 21

Hopper for wet recycled abrasive 3 was filled with wet recycled abrasive, almandine garnet of Australian origin with weight 300 kg, grain size 150-300 μm, 80 MESH. We started the fan, then we started vibration of vibration mesh 12 at frequency 3000 rpm, screw feeder 4 loaded the first dose of recycled wet abrasive with weight 1.5 kg and moisture 10% from hopper 3. Recycled abrasive moved on vibration mesh 12, it was aerated with incoming air with flow rate 5400 m³/hour, velocity 1.5 m/s and pressure 398 Pa with temperature 25° C. Weight increase was monitored using a scale, the process dosing—drying—weighting was repeated after weight increase on the scale minus 10% (water share) in loaded weight of wet recycled abrasive C was achieved.

After screw feeder 4 was empty, the equipment was switched OFF automatically. 270 kg of recycled abrasive has got dry, the drying time was 7.2 hours, recycled abrasive lost 26.7 kg of its weight compared with wet conditions, which is just 10%.

Example 6

Drying Unit 22 in Static Conditions

Drying unit 22 involved drying chamber 5, chimney 18 and air chamber 17. Chimney 18 was fitted with inlet 19 for wet recycled abrasive and ait outlet F. Two vibro motors 11 fixed to vibration frame 14 were positioned in the upper part of air chamber 17 and air chamber 17 emptied into a fan, which was used as source 6 of air flow.

Drying chamber 5 involved vibrating mesh 12 fixed to vibration frame 14 and collecting vessel 13 with height 156.5 mm and diameter 500 mm. Collecting vessel 13 was sloped at 12° towards mesh 12, it had groove 25, which emptied into outlet 15 of dry recycled abrasive from the drying chamber 5, collecting vessel 13 was positioned concentrically with mesh 12 with diameter 710 mm and height 28.5 mm above mesh 12. Air flow occurs in annulus space 16 (710/500 mm) and it lifts and aerates recycled abrasive to dry. There were 8 vertical blades 20 to deflect grains into vertical movement. The total height that the grains of abrasive had to overcome was 185 mm. Sensors 23 were installed on collecting vessel 13 to detect quantity of dry recycled abrasive, providing for continuous drying process with optimum rate of dosing of wet recycled abrasive.

Example 7

Process of Drying Recycled Abrasive in Drying Unit 22

Drying of almandine garnet of Australian origin containing $SiO_2$, $Al_2O_3$ and FeO.

The operator relieved the scale before starting the process, switched the main switch ON, calibrated (reset) the scale, again loaded the scale with dry recycled abrasive, switched the equipment, the control system detected 100 kg of dry recycled abrasive on output. Hopper for wet recycled abrasive 3 was filled with wet recycled abrasive with weight 400 kg, grain size 150-300 µm, 80 MESH. We started the fan, then we started vibration of vibration mesh 12 at frequency 3000 rpm, screw feeder 4 loaded the first dose of recycled wet abrasive with weight 2 kg and moisture 10% from hopper 3.

Recycled abrasive moved on the vibration mesh, it was aerated with incoming air with velocity 1 m/s and pressure 375.47 Pa and temperature 22° C. Weight increase was monitored using a scale, the process dosing—drying—weighting was repeated after weight increase on the scale minus 10% (water share) in loaded weight of wet recycled abrasive was achieved.

After hopper 3 and screw feeder 4 were empty, the equipment was switched OFF automatically. 358 kg of recycled abrasive has got dry, the drying time was 12 hours, recycled abrasive lost 42 kg of its weight compared with wet conditions.

Example 8

Process of Drying Recycled Abrasive in Drying Unit 22

The operator relieved the scale before starting the process, switched the main switch ON, calibrated (reset) scale 8, again loaded scale 8 with dry recycled abrasive, switched the equipment, the control system detected 50 kg of dry recycled abrasive on output. Hopper for wet recycled abrasive 3 was filled with wet recycled abrasive, namely mixture of $SiO_2$ and $Al_2O_3$ with weight 420 kg and average moisture 9.8%, grain size was 300-150 µm, 80 MESH. We started the fan which is source (6) of air flow (E) with acoustic pressure 77 dB with air flow 1.5 m³/s. Then vibro motors 11 were switched ON to vibrate vibration mesh 12 at frequency 3000 rpm. Screw feeder 4 delivered the first dose of recycled wet abrasive with weight 1.5 kg and moisture 15.5% from hopper 3 for wet recycled abrasive to mesh 12. Moisture of loaded wet recycled abrasive decreased during the process, as the highest share of water left bottom of hopper 3 for wet recycled abrasive in the first doses of wet recycled abrasive.

Recycled abrasive moved on vibration mesh 12, it was aerated with incoming air with air speed 1.02 m/s, temperature 24° C. and pressure 368.52 Pa. Weight increase was monitored using scale 8, the process dosing—drying—weighting was repeated after weight increase on the scale minus 10% (water share) in loaded weight of wet recycled abrasive was achieved. 420 kg of recycled abrasive has got dry, the drying time was 6 hours, recycled abrasive lost 42.5 kg of its weight, compared with wet conditions, which corresponds to moisture of recycled abrasive and removed dust particles. The output of the drying process was 33 kg/hour.

Example 9

Process of Abrasive Drying in Drying Unit 22

Hopper 3 for wet recycled abrasive was filled with wet recycled abrasive mixture of $SiO_2$, $Al_2O_3$ and FeO with weight 283 kg and average moisture 10%, grain size was 300-150 µm, 80 MESH. We started the fan with air flow 1.5 m³/sec. Then vibro motors 11 were switched ON to vibrate vibration mesh 12 at frequency 3000 rpm. Screw feeder 4 delivered the first dose of recycled wet abrasive with weight 1.5 kg and moisture 15.5% from hopper 3 for wet recycled abrasive to mesh 12

Moisture of loaded abrasive decreased during the process, as the highest share of water left bottom of hopper 3 for wet recycled abrasive in the first doses of wet abrasive.

Recycled abrasive moved on vibration mesh 12, it was aerated with incoming air with air speed 1.02 m/s, temperature 19° C. and pressure 368.52 Pa. Weight increase was monitored using scale 8, the process dosing—drying—weighting was repeated after weight increase on the scale minus 10% (water share) in loaded weight of wet recycled abrasive was achieved. 257 kg of recycled abrasive has got dry, the drying time was 15.5 hours, recycled abrasive lost 25.7 kg of its weight compared with wet conditions, which corresponds to moisture of recycled abrasive and removed dust particles. The output of the drying process was 19 kg/hour.

Example 10

We performed a test with variable rate of air flow, namely 1.04 m/s to 1.23 m/s, and transport pressure in range 306-360 Pa in change in sine curve with wave with time change 20 seconds at air temperature 23° C.

The total drying time was 1.1 hour and quantity of dry recycled abrasive was 72.3 kg. The input wet recycled abrasive had moisture 10%. The drying process was quite efficient, 66 kg of recycled abrasive per hour has got dry.

Example 11

Dependence of flowing air temperature on drying time of recycled abrasive was examined. The tests ran with input specimen 10 kg. The results concerning achieved times, energy input and temperature are presented in FIGS. 8 to 10. Above all, link between air flow temperature and energy input must be considered as change of temperature because of additional heating. Then, temperature always changes according to change in power input. This fact must be considered as increase of drying potential not only because of higher temperature but also because of lower relative air humidity. From the results we can derive linear dependence both in energy input—drying capacity and input moisture—drying capacity. This finding allows to deduce that the drying rate of input is proportional to its moisture which had not been considered. The original assumption was that when water quantity in recycled abrasive decreases, more recycled abrasive can lift and drying will be more efficient.

LIST OF MARKS FOR TERMS

A. Input of mixture from cutting bench
B. waste—fine fraction
C. wet recycled abrasive
D. dry recycled abrasive
E. air input
F. air output
1. desludging
2. desludging separator
3. hopper for wet recycled abrasive
4. feeder
5. drying chamber
6. source of air flow
7. hopper for dry recycled abrasive
8. scale
9. cyclone separator
10. electric panel
11. vibro motor
12. mesh
13. collecting vessel
14. vibration frame
15. output of dry recycled abrasive from the drying chamber 5
16. free space between wall of collecting vessel 13 and wall of drying chamber 5
17. air chamber
18. chimney
19. input of wet recycled abrasive into drying unit 21
20. blades
21. drier of recycled abrasive
22. drying unit
23. sensor
24. system to fix mesh
25. groove of collecting vessel 13
26. wall of collecting vessel 13

APPLICABILITY IN INDUSTRY

Cutting with high pressure water jet, accessories to CNC machines for cutting with high pressure water jet. Recycling abrasive material used for cutting with high pressure water jet.

The invention claimed is:

1. A drying chamber (5) for drying of recycled abrasive characterized by the fact that it contains a vibrating mesh (12), a collecting vessel (13) with sloped bottom, that is positioned above the vibrating mesh (12) and occupies 50 to 80% of area above the vibrating mesh (12), which limits a free space (16) where a vertical blades (20) are positioned, between an internal wall of the drying chamber (5) and an external wall of the collecting vessel (13) and the collecting vessel (13) empties into an output (15) of dry recycled abrasive from the drying chamber (5).

2. The drying chamber (5) for drying of recycled abrasive according to claim 1 characterized by the fact that the bottom of the collecting vessel (13) is sloped towards the vibrating mesh (12) with angle 5 to 20°.

3. The drying chamber (5) for drying of recycled abrasive according to claim 1 or 2 characterized by the bottom of the collecting vessel (13) contains a groove (25) that empties into the output (15) of dry recycled abrasive from the drying chamber (5).

4. The drying chamber (5) for drying of recycled abrasive according to claim 1 characterized by the fact that it has sensors (23) installed to detect quantity of recycled abrasive.

5. The drying chamber (5) for drying of recycled abrasive according to claim 1 characterized by the fact that a vibration frame (14) has been fixed to vibrating mesh (12) and two vibro motors (11) are fixed to it.

6. The drying chamber (5) for drying of recycled abrasive according to claim 1 characterized by the fact that the vibro motors (11) work at 2000 to 4000 rpm.

7. A drying unit (22) characterized by the fact that it consists of drying chamber (5) according to claim 1, connected in its upper part to a chimney (18) for exhaust of dust particles and connected in its lower part to an air chamber (17), wherein the chimney (18) in fitted with input (19) of wet recycled abrasive and an air outlet (F) and the air chamber (17) empties to a source (6) of air flow.

8. The drying unit (22) according to claim 7 characterized by the fact that the source (6) of air flow generates air with velocity 0.76 to 1.23 m/s and pressure 498 to 306 Pa.

9. The drying unit (22) according to claim 8 characterized by the fact that the source (6) of air flow generates air with velocity 0.85 to 1.04 m/s and pressure 442 to 362 Pa.

10. The drying unit (22) according to claim 7 characterized by the fact that the source (6) of air flow is a fan.

11. The drying unit (22) according to claim 10 characterized by the fact that the fan sucks waste heat from a hydraulic oil cooler.

12. A drier of recycled abrasive (21) with a cyclone separator (9) characterized by the fact that it contains the drying unit (22) according to claim 7, a hopper (3) for wet recycled abrasive, a hopper (7) for dry recycled abrasive and a scale (8), where a screw feeder (4) is positioned in narrow bottom of the hopper (3) for wet recycled abrasive, which empties into an input (19) of wet recycled abrasive into the drying unit (22), the chimney (18) of the drying unit (22) empties into the upper part of the cyclone separator (9) and an output (15) of dry recycled abrasive from the drying chamber (5) empties to its lower part, the lower part of the cyclone separator (9) is tightly connected to the hopper (7) for dry recycled abrasive and the hopper (7) for dry recycled abrasive is placed on the scale (8).

13. The drier of recycled abrasive (21) according to claim 11 characterized by output (15) of dry recycled abrasive from the drying chamber (5) is equipped with the sensor (23).

14. A method for drying wet recycled abrasive using the drying chamber (5) according to claim 1 characterized by the fact that the drying chamber (5) is inserted into air flow with velocity 0.78 to 1.23 m/s and pressure 500 to 300 Pa, which is heated with waste heat from operation of machines for hydroabrasive separation with water jet, the vibrating mesh (12) vibration is set off, with rate 1500 rpm or more, wet recycled abrasive (C) is delivered to the vibrating mesh (12) and dry recycled abrasive (D) from the output (15) of dry recycled abrasive from the drying chamber is collected into the hopper (7) for dry recycled abrasive.

\* \* \* \* \*